D. T. HASTINGS.
FOOT REST FOR VEHICLES.
APPLICATION FILED OCT. 22, 1914.

1,189,944.

Patented July 4, 1916.

Inventor
Donald T. Hastings

Witnesses

Attorneys

UNITED STATES PATENT OFFICE.

DONALD T. HASTINGS, OF DETROIT, MICHIGAN, ASSIGNOR, BY MESNE ASSIGNMENTS, TO HUPP MOTOR CAR CORPORATION, OF RICHMOND, VIRGINIA, A CORPORATION OF VIRGINIA.

FOOT-REST FOR VEHICLES.

1,189,944.          Specification of Letters Patent.          Patented July 4, 1916.

Application filed October 22, 1914. Serial No. 868,035.

*To all whom it may concern:*

Be it known that I, DONALD T. HASTINGS, a citizen of the United States of America, residing at Detroit, in the county of Wayne and State of Michigan, have invented certain new and useful Improvements in Foot-Rests for Vehicles, of which the following is a specification, reference being had therein to the accompanying drawings.

The invention relates to foot rests for vehicles and resides in the provision of a simple and efficient foot rest; in a construction whereby the foot rest when not in use, is positioned out of the way; and further, in certain details of construction as will more fully hereinafter appear.

Figure 1:
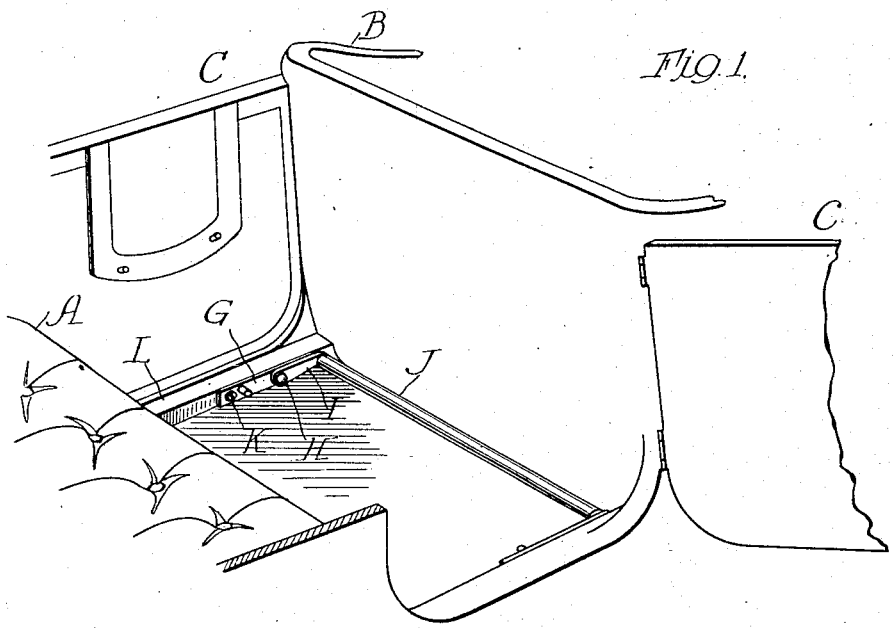
Figure 2:
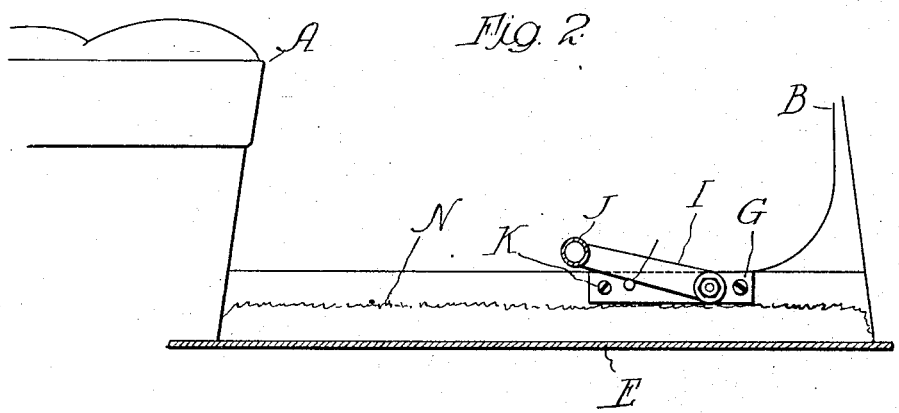

In the drawings, Figure 1 is a fragmentary perspective view of a motor vehicle with the improved construction of foot rest applied thereto; and Fig. 2 is a sectional side elevation.

A designates the rear seat of a motor vehicle, B the front seat, C the doors between the seats, and E the floor of the vehicle.

G are brackets attached to the body of the vehicle and to which the improved foot rest is connected. The latter comprises arms I pivotally connected at H to the brackets, and a rail J that is attached to and carried by the outer ends of the arms I. The brackets G have stops K upon which the arms I rest when the rail J is in operative position to the rear seat, as shown in Fig. 2. The brackets G are so arranged and the arms I are of such a length that when the rail J is moved out of operative relation to the rear seat, the member J is in immediate proximity to the back of the front seat, since as will be apparent upon reference to Fig. 1, the foot rest folds forwardly. By having the foot rest fold forwardly, it not only is completely out of the way of the occupants of the rear seat, but also is to one side of the door-ways.

In the particular structure illustrated, the body of the car is provided with portions L intermediate the front and rear seats, which project a slight distance above the floor E of the car. The brackets G are shown as in the form of flat plates attached as by means of screws M or other suitable fastening means to the inner faces of the portions L, so as to lie below the plane of the upper edges of these portions. In the preferred form of the structure the foot rest when folded forwardly also lies below the plane of the upper edges of the parts L. N is the usual mat which is laid over the floor of the car.

While the preferred form of the invention has been shown and described, it is not desired to limit the protection to the particular structure illustrated, but the invention is considered of sufficient scope to embody various modifications.

What I claim as my invention is:

1. The combination with vehicle frame having corresponding side portions projecting slightly above its bottom, of arms pivotally mounted upon the inner faces of said portions, a foot rail extended between the free ends of said arms, and stops projecting oppositely inward from the inner faces of said portions to support the foot rest at an elevation above the frame bottom.

2. The combination with a vehicle frame having corresponding side portions projecting slightly above its bottom, of brackets secured to the inner faces of said side portions below the upper edges thereof, arms pivotally connected to the brackets, a foot rail extended between the free ends of said arms, and stops projecting inwardly from the respective brackets engaged by said arms in their rearmost positions, to support the foot-rest at an elevation above the frame bottom.

In testimony whereof I affix my signature in presence of two witnesses.

DONALD T. HASTINGS.

Witnesses:
ADRIAN J. NEERKEN,
FRANK E. WATTS.

Copies of this patent may be obtained for five cents each, by addressing the "Commissioner of Patents, Washington, D. C."